United States Patent
Sigler

(10) Patent No.: US 6,861,609 B2
(45) Date of Patent: Mar. 1, 2005

(54) WELDING ELECTRODE FOR ALUMINUM SHEETS

(75) Inventor: David Rudolph Sigler, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 63 days.

(21) Appl. No.: 10/611,840

(22) Filed: Jul. 1, 2003

(65) Prior Publication Data

US 2005/0000947 A1 Jan. 6, 2005

(51) Int. Cl.[7] .............................................. B23K 11/00
(52) U.S. Cl. .................................. 219/117.1; 219/119
(58) Field of Search ............................. 219/117.1, 119

(56) References Cited

U.S. PATENT DOCUMENTS

| | | | |
|---|---|---|---|
| 4,972,047 A | | 11/1990 | Puddle et al. |
| 5,783,794 A | * | 7/1998 | Oikawa et al. ............. 219/118 |
| 5,961,853 A | * | 10/1999 | Thornton ................. 219/85.14 |
| 6,403,913 B1 | | 6/2002 | Spinella et al. |

OTHER PUBLICATIONS

William R. Oates, Risistance Welding, Welding Handbook, pp. 72–79, vol. 3, American Welding Society, Miami, Florida.

Table 7, Guidelines to Resistance Spot Welding Aluminium Sheet, Guidelines to resistance spot welding alumnim automotive sheet, p. 13, the Aluminum Association Incorporated, Washington, DC.

Edward P. Patrick, Donald J. Spinella, The Effects of Surface Characteristics on the Resistance Spot Weldability of Aluminum Sheet, Sheet Metal Welding Conference VII, Oct. 9–11, 1996, American WElding Society, Detroit Section.

* cited by examiner

*Primary Examiner*—Tom Dunn
*Assistant Examiner*—Len Tran
(74) *Attorney, Agent, or Firm*—Kathryn A. Marra

(57) ABSTRACT

A design of copper welding electrode is disclosed. The electrode can be used in successive spot welding operations on assembled aluminum alloy sheet parts of widely varying thicknesses, e.g., from 0.9 to 4+ mm. The electrode has a round body terminating in a truncated cone with a crowned face. The face has a diameter of about eleven millimeters up to the diameter of the body and the radius of the crowned face is about twenty to thirty millimeters. The dimensions and shape of the electrode provide robust welding performances despite varying part thicknesses and off angle electrode positioning, and the textured surface provides good electrical contact.

17 Claims, 3 Drawing Sheets

WELDING ELECTRODE FOR ALUMINUM SHEETS

TECHNICAL FIELD

This invention pertains to flexible manufacturing operations involving electrical resistance spot welding of aluminum sheet metal workpieces. More specifically this invention pertains to a method of successively welding sheet metal workpieces of different thicknesses using single design, truncated cone, copper or copper alloy, textured welding electrodes.

BACKGROUND OF THE INVENTION

Current automotive vehicle manufacturing operations need to be adaptable to make different parts or components with the same equipment and with minimal modification of the equipment or tools. Such operations include, for example, the joining of two sheet metal layers by spot welding. Vehicle body panels such as doors, hoods, deck lids and liftgates are often assembled by joining inner and outer panels stamped from sheet metal of suitable aluminum or ferrous alloys. The thickness of each sheet metal layer may vary from less than one millimeter to more than four millimeters. Electrical resistance spot welding is often used to join such inner and outer panels and other sheet metal parts.

In the case of sheet metal body components, flats or flanges of two or three components are placed together and then a series of spot welds are made to securely attach the panels. Welding practices have been developed for such spot welding operations. Good welding practices are particularly critical in joining aluminum sheet alloys because of the high electrical and thermal conductivity of the material and the omnipresent oxide coating on the surface. The spot welding operation is accomplished by assembling the parts in a suitable fixture and pressing welding electrodes against opposite sides of the touching parts at the intended weld location. The welding electrodes provide both clamping force and current commutation for the weld.

Welding practice has specified different sized welding tips or electrodes depending upon the metal to be welded and the thicknesses of the layers to be joined. The welding electrodes are part of a welding apparatus including a welding gun that would be moved and actuated to press the electrodes against the assembled layers. The apparatus would then deliver a momentary welding current to the electrodes to effect the weld. The clamping force, the welding current (single phase alternating current, 60 Hz, or rectified direct current) and current duration (several cycles of the 60 cycle current) are also specified for the electrodes to be used. Thus, a particular welding center would require several different welding electrodes to accommodate different part thicknesses.

For example, The Aluminum Association, Inc. publishes "Guidelines to Resistance Spot Welding Aluminum Automotive Sheet." Table 7 of that Guideline identifies ten different sheet metal thickness steps from 0.6 mm to 3.2 mm for the nominal thickness of the thinner aluminum sheet of the pair to be welded. Two sheets to be joined may be of different thicknesses within such range. Further, successive assemblies in a lineup of welding jobs may vary substantially in thickness. Corresponding to these thickness designations are five different electrode tip diameter and shape specifications. These requirements, based on welding experience, have complicated the creation of a flexible welding center for aluminum sheet metal assemblies of typical varying thicknesses because of the need for so many different welding electrodes.

It is an object of this invention to provide a practice for simplifying the tooling requirements of a welding center or station for accommodating aluminum sheet metal parts of varying thicknesses; for example, sheet thicknesses varying over a range from at least about 0.9 to over 4 mm. Another object of this invention is to provide a "universal" welding electrode of shape and size suitable for use in welding such a range of aluminum sheet thicknesses.

SUMMARY OF THE INVENTION

This invention uses a resistance spot welding electrode that can suitably weld all gauges of aluminum sheet that are typically used in automotive body structures. A spot welding operation is contemplated in which successive assemblies of aluminum alloy sheets of varying thicknesses are brought to a welding gun with "universal" electrodes. Thus, the successive spot welds are made without having to change the electrodes (except for wear) or the welding gun even though there is a significant difference in the thickness of the sheets within or between the assembled pieces.

Each such universal electrode is formed of copper metal. It has a round electrode body with a welding face end for pressing against the surface of a sheet layer to be welded. Preferably, the welding face is a truncated round cone for improved access to parts to be welded. The truncated conical end is crowned and constitutes the welding face of the electrode. The diameter of the body is suitably in the range of about 11 mm to about 19.5 mm, for example, 19.05 mm (¾ inch). The diameter of the body is not critical. It must be at least the size of the welding face and be constructed to sustain the 1500 pound weld load used for aluminum sheet thicknesses of 3.5 to $4^+$ mm.

The diameter of the welding face is preferably about 11.8 to 11.9 mm and suitably about 11 mm to 19 mm. The lower value of the weld face size is limited by the requirement of at least about eleven millimeters in diameter for welding heavy gauge sheet of 3.5 to $4^+$ mm. The welding face could be as large as the body of the electrode The radius of curvature of the crowned welding face is preferably about 25.4 mm. A nominal radius of curvature of about one inch provides excellent welding performance with a range of aluminum sheet thicknesses. Suitable radii of curvature typically lie in the range of about 20 mm, the lower limit for heavy gauge metal to about 35 mm, the upper limit for light gauge sheet metal. A radius of 50 mm is too flat for the intended universal application of this electrode.

The machining of the welding face to its specified radius normally leaves it with a relatively smooth surface. This surface is then made rough or provided with a texture by blasting with small grit particles (steel, sand, etc.) or sanding with course abrasive paper.

While the diameter of the welding face is large compared to electrodes specified for welding aluminum sheets at the lower end of the range of about 0.9 to about 4 mm, the radius of curvature of the welding face is smaller than that of such electrodes. Contoured faces are also used with conventional welding electrodes but the radii of curvature are two to six times greater than the one inch radius of the electrode of this invention. Thus, the curvature of the face is more pronounced. This accomplishes three goals. First, the smaller radius face concentrates the current flow at each face/sheet metal interface to better concentrate heat in the underlying metal and promote nugget formation. Second the small curvature keeps the face/sheet contact areas of the opposing electrodes closer together when the electrodes are applied off-angle as often happens in repetitive welding operations. The close contact areas means that the current flow path is still kept short and, again, concentrates heat for nugget formation. Third, the small curvature concentrates the clamping force of the large electrode face and concentrates current flow despite gaps between the faying surfaces of the sheets. Rolled and formed aluminum sheets do not always present flat surfaces at a weld interface and subject electrode accommodates gaps between sheets to be joined.

The large face diameter is used for two reasons. The electrode can be used to weld heavy gauge sheets of, e.g., 3.5 to 4 mm where a nugget size of greater than nine millimeters is wanted. Second, the electrode can be tilted more than conventional electrodes without the edge of the welding face digging into the sheet. This feature allows for much greater tolerance in the angle of application of the electrodes which is important in welding some sheet metal assemblies of complex curvature. The large, but rounded face avoids radical changes in current density and drastic changes in surface topography at the weld site.

The textured surface of the electrode face also improves the welding process. The roughened surface penetrates any oxide film and/or contamination on the surface of the part at the weld location. Such surface film penetration reduces electrical resistance at the contact interface of the electrode and part. Reduction of the contact resistance reduces the interface temperature and reduces or prevents expulsion of molten material from the weld site. This is particularly helpful for heavy gauge (>2 mm) material where the sharp radius of curvature can cause metal to extrude out from beneath the welding electrode giving significant expulsion. Texturing prevents this, first, by locking onto the metal surface and preventing relative motion between the electrode and sheet and, second, by reducing metal softening by reducing contact resistance. The textured surface of the electrode face also helps to lock the tip onto the sheet surface at the weld site to stabilize the current path and make welding operations more robust for all gauges.

The use of two welding electrodes in spot welding operations as specified in the above paragraphs simplifies the conduct of successive welds performed on part layers of markedly different thicknesses. These textured, large diameter electrodes with the small radius crowned face perform remarkably well in applications where parts of different thicknesses and shaped need to be welded with the same welding tools. In fact it has been observed that such "universal" electrodes perform as well on part thicknesses from 0.9 to 4.1 mm as the individual electrodes specified for narrow sheet gauges within this broad range.

Other objects and advantages of the invention will become more apparent from the following detailed description of preferred embodiments.

DESCRIPTION OF THE PREFERRED EMBODIMENT

This invention provides a universal spot-welding electrode design for use in welding operations that are to be successively applied in spot-welding assemblies of aluminum alloy sheet metal of varying thicknesses. Often welding assemblies have been set up to perform substantially the same spot-weld on an identical assembly of aluminum alloy sheet pieces time after time. In other words, a particular welding gun with suitably sized and shaped welding electrodes repeatedly forms spot-welds on aluminum alloy sheets each having a thickness of, for example, 1.5 mm. Thus, the welding electrodes are specifically designed to provide good weld contact with the surfaces of these sheets at the weld sites.

As described above, The Aluminum Association, Inc. identifies ten different sheet metal thickness steps from 0.6 mm in thickness to 3.2 mm thickness for the thickness of the thinner layer in the weld assembly. And corresponding to this thickness groups are five different electrode face diameter and shape specifications. Thus, given a specified common welding job it is possible to select a specified electrode from the Aluminum Association publication.

However, there are many manufacturing operations in which it would be desirable to have a welding set-up wherein the welding station could receive assembled aluminum alloy sheets of varying thicknesses within a range of, for example, 0.9 to 4.1 mm which represent the range of sheet metal thicknesses involved in commercial manufacture of an aluminum body vehicle. Heretofore such a body welding operation has required a plurality of weld guns with several different welding electrode sizes and shapes. The alternative to providing different guns is to interrupt the operation to change the electrode tips. It is highly desirable to have available an electrode design that would accommodate more flexible spot welding operations. This invention provides such a "universal" welding electrode.

Figure 1:
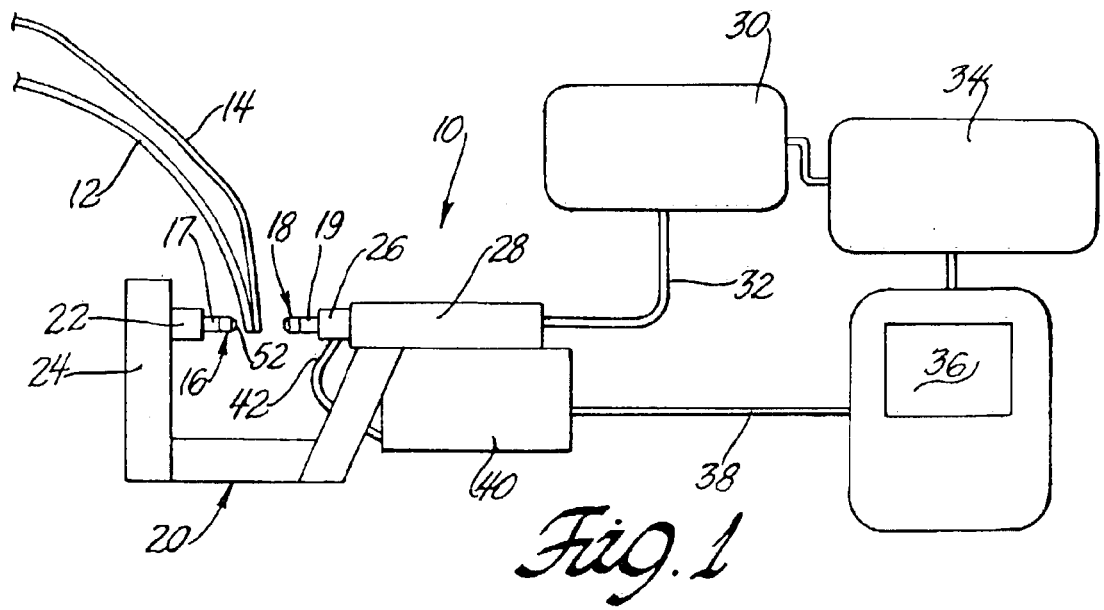
FIG. 1 is a schematic representation of a welding apparatus utilizing weld electrodes of this invention in spot welding of a relatively thick sheet metal reinforcement piece to an automotive vehicle liftgate inner panel.

FIG. 1 is a schematic illustration of a side view of a representative spot welding gun apparatus 10 with the associated equipment utilized in spot welding operations. In such an operation, an assembly of two or more sheet metal layers to be welded is prepared at a suitable location and transported by means, not shown to the welding gun apparatus 10. In this example, the assembled sheets consist of a relatively thick reinforcing sheet (2.5 mm) 12 of aluminum alloy (e.g., AA5182) to be spot welded to the edge of a thinner sheet (1.2 mm, AA5182) of an automobile vehicle liftgate panel 14. The reinforcement sheet 12 and the liftgate panel sheet 14 are shown in side view in FIG. 1.

The assembled sheets 12, 14 are shown placed between axially aligned and opposing electrodes 16, 18 of welding gun arm 20. It is seen that gun arm 20 is in the configuration of a "C" so that opposing electrodes 16, 18 can be brought to bear and press on opposite sides of the overlapped assembled sheets 12, 14.

In the arrangement shown, electrode 16 is mounted on a shank 17 which is inserted in a holder 22 attached to a fixed arm 24 of welding gun arm 20. The other electrode 18 is mounted on shank 19 and inserted in another holder 26 carried in an air cylinder 28. Air cylinder 28 is adapted to axially move electrode 18 into clamping engagement with the outer surface of the lift gate panel 14. A source of high pressure air from a remote source, not shown, delivers air through a programmable air regulator 30 through air line 32 to air cylinder 28. During a spot welding sequence, the timely application of air pressure to air cylinder 28 advances holder 26 so that electrode 18 presses sheets 12 and 14 against stationary electrode 16 with a force of the order of 800 to 1500 pounds.

The welding gun 20 shown in FIG. 1 may be stationary or it may be applied on the end of a robot arm. In either arrangement, a spot weld controller is associated with welding gun 20 to suitably execute a spot welding operation.

As illustrated in this FIG. 1 robot/machine controller 34 is programmed or used to initiate and control the movement of the robot or the actuation of the welding machine to engage or to receive the assembled sheet metal parts. Machine controller 34 manages and actuates programmable air regulator 30 and a welding controller 36. Welding control 36 regulates the passage of a primary welding current from a remote source, not shown. The welding energy source may be three phase, 60 Hz, high voltage, low current alternating current. Upon command of welding controller 36, the primary current is delivered through primary current line 38 to weld transformer 40. Weld transformer 40 converts the primary current to a lower voltage, higher current, secondary welding current. The secondary welding current is provided through secondary current line 42 and electrode holder 26 as well as conductive gun arm 20 and electrode holder 22. The welding current may be of the order of 15,000 to 40,000 amperes depending upon the requirements of the welding operation. Where 60 cycle AC current is provided, the total welding time for a typical spot weld may, e.g., be from 5–20 cycles of the 60 hertz current.

The welding of reinforcing panel 12 to liftgate panel 14 may require many spot welds around the perimeter of the panels. Machine controller 34 manages the overall motion of the electrodes (through programmable air regulator 30) and the passage and timing of the welding current through weld controller 36. Each cycle comprises closing the electrodes on an interposed assembly to be welded, applying a suitable clamping force by the electrodes to press the layers of sheet metal together, passing an impulse of welding current through the pieces to form a weld nugget of suitable size between them, opening the electrodes and removing or repositioning the workpiece for another weld.

Figure 2:
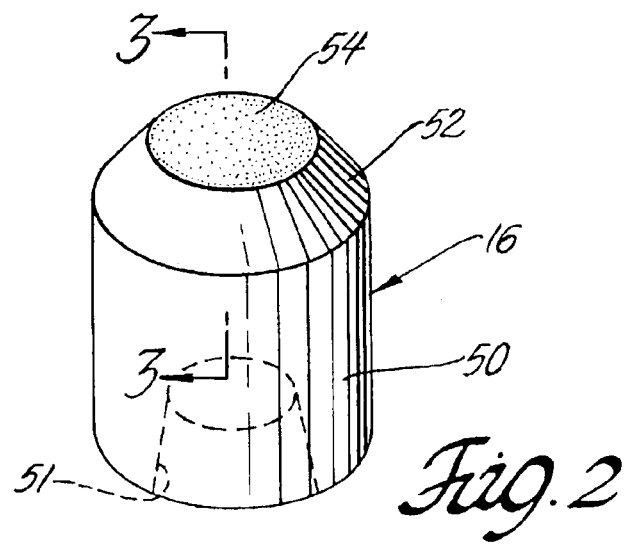
FIG. 2 is an oblique view of a "universal" electrode for use in the practice of this invention.

In the practice of this invention a single design copper body electrode is provided for use as both electrodes 16 and 18 in spot welding aluminum alloy sheets that may vary in thickness from less than 1 mm to more than 4 mm. Referring to FIG. 2 the electrode 16 (and electrode 18 is identical) has a round body 50 with a truncated conical end 52. Body 50 has a hollow receptacle 51 adapted to receive a shank 17 for insertion in holder 22, or the like of a welding gun. The welding surface or face 54 of the truncated conical end 52 is crowned. In accordance with the invention, the crowned welding face 54 is roughened by blasting with small grit steel or sand particles or abrasion with a course abrasive paper. The shape, dimensions and surface roughness of the welding electrode are critical in the practice of this invention.

Figure 3:
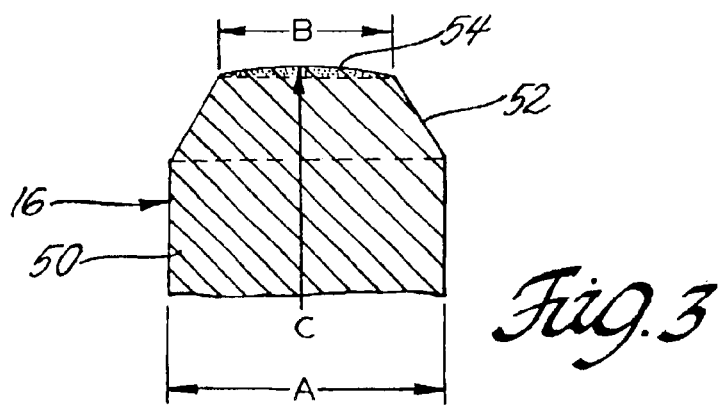
FIG. 3 is a sectional view of the electrode shown in FIG. 2 taken in the direction indicated at 3—3 in FIG. 2.

Referring to FIG. 3, the diameter (A in FIG. 3) of electrode body 50 is, for example, about 19.05 mm (three-quarters of an inch). The diameter of the electrode body 50 is not critical, but it must be constructed to withstand the 1500 pound (or so) weld force applied to thick aluminum sheets and it must be at least the diameter of the welding face 54. The diameter (B in FIG. 3) of the welding surface 54 is suitably 11.85 mm and preferably in the range of about 11.5–12.5 mm, but can be as small as 11 mm or as large as the electrode body diameter up to about 19 mm. The radius of curvature (C in FIG. 3) of welding face 54 is suitably 25.4 mm and preferably in the range of 20–35 mm.

The diameter of the round body accommodates the shaping and size of the truncated electrode end and welding face.

The diameter of the welding face is large compared to spot welding electrodes specified for welding aluminum sheets at the low end of the range of about 0.9 mm to $4^+$ mm. But the radius of curvature of the welding face is smaller than that of such electrodes. Contoured faces are also used with conventional welding electrodes but the radii of curvature are several times greater than the one inch radius of the electrode of this invention. Thus, the curvature of the welding face on the subject electrodes is more pronounced. The smaller radius face concentrates the current flow at each face/sheet metal interface to better heat the underlying metal and promote nugget formation. The small curvature keeps the face/sheet contact areas of the opposing electrodes closer together when the electrodes are applied off-angle as often happens in repetitive welding operations. The close contact areas means that the current flow path is still kept short and, again, concentrates heat for nugget formation. And the small curvature concentrates the clamping force of the large electrode face and concentrates current flow despite gaps between the faying surfaces of the sheets. Rolled and formed aluminum sheets do not always present flat surfaces at a weld interface and the subject electrode accommodates gaps between sheets to be joined.

The large face diameter of the subject electrodes is also important. The large face electrode can be used to weld heavy gauge sheets of, e.g., 3.5 mm where a nugget size of greater than nine millimeters is wanted. Further, the electrode can be tilted more than conventional electrodes without the edge of the welding face digging into the sheet. This feature allows for much greater tolerance in the angle of application of the electrodes which is important in welding some sheet metal assemblies of complex curvature. The large, but rounded face avoids radical changes in current density and drastic changes in surface topography at the weld site.

The textured surface of the electrode face also improves the welding process. Preferably the roughened surface is characterized by randomly distributed craters with peak to valley dimensions (called roughness) in the range of 5 to 30 micrometers and with substantially the same range of peak to peak spacing. For example, the grit blasting process produces a random surface roughness with a nearly perfect Gaussian distribution. The roughened surface permits the electrode face to penetrate any oxide film and/or contamination on the surface of the part at the weld location. Penetration of the surface film reduces electrical resistance at the contact interface of the electrode face and part. Reduction of the contact area resistance reduces the interface temperature and reduces or prevents expulsion of molten material from the weld site. The textured surface of the electrode face also helps to lock the tip onto the sheet surface at the weld site to stabilize the current path and make welding operations more robust. For heavy gauge (>2 mm) material, the combination of reduced contact resistance and locking onto the sheet surface prevents softened metal from extruding around the electrode face which would otherwise occur because of the electrode's sharp radius of curvature.

Welding tests have demonstrated the excellent performance of the electrodes of this invention in forming spot welds in assemblies of many different gauges of aluminum sheets in the range of from about 0.9 mm to about 4 mm. Following is a detailed description of several such comparison tests.

In a first group of three sets of tests, spot welds were formed on test specimens consisting of two overlapping strips of heavy gauge AA5083. The thickness of each of the overlapping sheet pieces was 2.5 mm. AA5083 aluminum alloy is a commercially available sheet material that contains, by weight, about 4 to 4.9% magnesium and 0.4 to 1.0% manganese. This sheet material has been used in the elevated temperature stretch forming of automotive body panels. In the spot welding of two or more layers of body panel sheet material, as described above, the assembled sheets are brought to a welding gun or a robot with a welding gun is directed to the assembly. The welding environment is not always ideal. Sometimes there is a small gap between the layers and sometimes the electrodes are not positioned perpendicular to the weld site when they are caused to clamp onto the sheets to be joined.

A welding apparatus with two commercially available MWZ-6257 copper electrodes was used to make welds on relatively small, 2.5 mm thick strips of the aluminum alloy. These electrodes are of the type used for spot welding such heavy gauge strip material. The electrodes had a 10 mm weld face diameter, 50.8 mm radius of curvature and an as-machined face. The electrodes were pressed against opposite sides of the overlapping sheet material with a force of 1,300 lbs. One aspect of the tests was to vary the welding current. The power source was three phase, 480 volt, 60 Hz current that was transformed by the weld control to single phase high frequency current (400 to 1000 Hz). A transformer reduced the voltage and increased the welding current delivered to the spot welding electrodes. The current was rectified by diode pack prior to being delivered to the electrodes for 14 cycles of the 60 Hz input. Since the welding current delivered in a welding operation can vary, the robustness of the electrodes was tested using a fairly wide spread of weld current values. Varying welding currents were employed in the range from 27,000 amperes to in excess of 37,000 amperes to make the welds.

In order to simulate welding conditions commonly experienced in forming spot welds on automotive body parts, different test sample conditions and electrode orientations were used in the welding of these overlapping sheets. Following a spot welding operation an electrode imprint is visible on both surfaces where contact was made by the electrodes. For each welding situation there is a minimum weld nugget size or button diameter that is characteristic of a suitable spot weld. In this first group of tests the minimum acceptable weld button diameter was 6.4 mm.

Figure 4A:
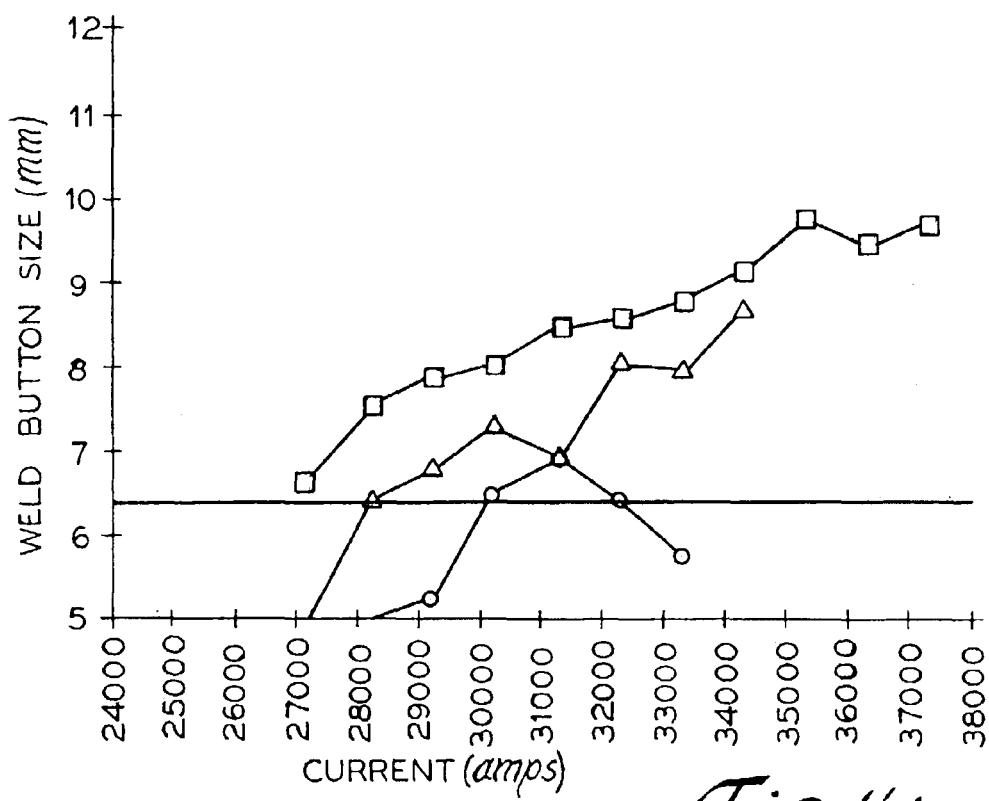
FIGS. 4A and 4B are graphs of weld button size in millimeters vs. welding current obtained in spot welding of heavy gauge sheets, each 2.5 mm thick and of AA5083 composition. The data in FIG. 4A was obtained using commercial MWZ-6257 copper electrodes for welding such sheets. The data in FIG. 4B was obtained using electrodes of this invention.

FIG. 4A presents three linear plots of weld button sizes vs. total weld current in amperes for three sets of welding tests. A first set of spot welds were formed using the commercial electrodes with no gap between the sheet layers and zero degrees offset angle of the electrodes. This data is provided as the linear plot of square (c) data points in FIG. 4A. Eleven welds were formed at increasing amperages. It is seen that each of the nugget sizes with the commercial electrode combination exceeded the minimum specification of 6.4 mm. As would be expected these MWZ-6257 welding electrodes performed well at the idealized welding condition.

A second set of spot welds was formed using the same test specimens and electrodes. In this set of tests a 1.6 mm gap was formed between the specimen layers at the weld location. Gaps of this size can occur in automotive body spot welding applications. The electrodes were oriented perpendicular to the contacted layers (zero degrees offset). The data for these welds is seen in the linear plot of FIG. 4A with triangle (Δ) data points. Seven good welds, although smaller, were formed as indicated by suitable nugget diameter. The commercially specified welding electrodes performed suitable spot welds with the electrodes perfectly aligned despite the gap between the pieces.

A third set of spot welds with the commercial electrodes was conducted. In these weld specimens there was no gap imposed between the sheets but the electrodes were offset from the ideal 90 degree contact angle by 6 degrees. The data for these spot welds is presented in the linear plot with circle (○) data in FIG. 4A. In these weld tests the specified low face diameter, high radius of curvature electrodes did not perform well for all current deliveries. Of the five welds made, two weld nuggets were too small and two were of minimum size.

Figure 4B:
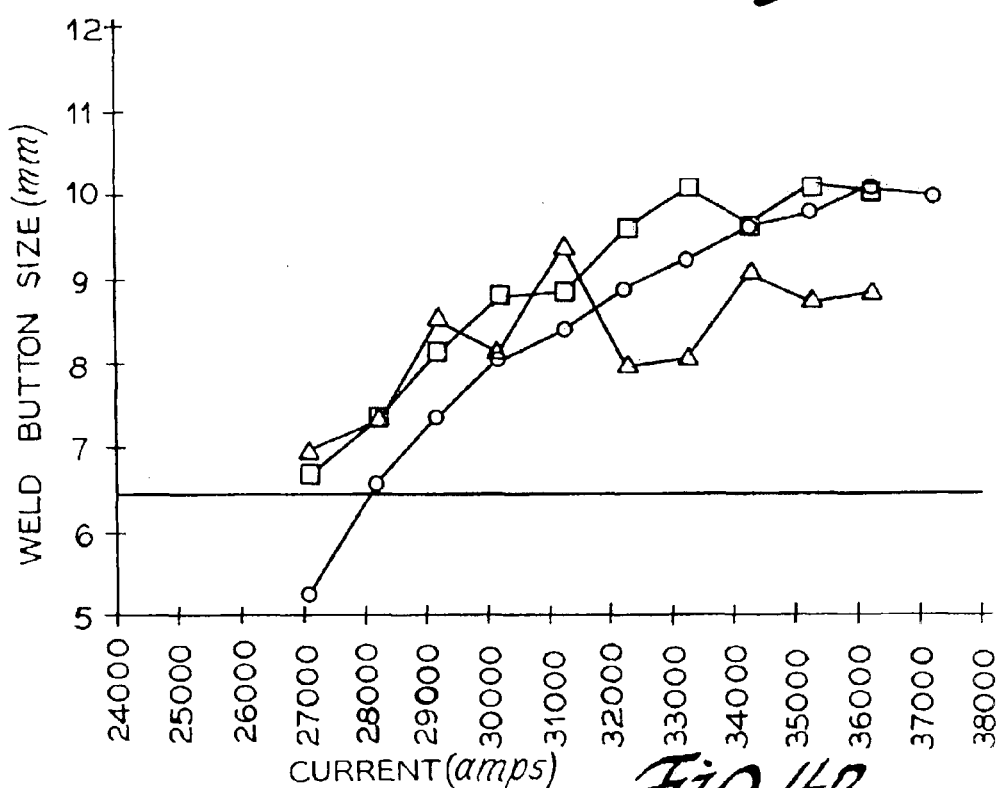

A second group of three sets of spot weld tests was conducted with the universal electrodes of the subject invention. The aluminum alloy sheet specimens were the same as the specimens used in the tests using the MWZ-6257 electrodes and summarized in FIG. 4A. The three sets of tests duplicated the welding conditions described above that produced the data in FIG. 4A. The linear plot of square (□) data points in FIG. 4B presents data for the universal electrodes with no gap between the sheet layers and no offset of the electrodes from the preferred perpendicular orientation. The linear plots of (Δ) and (○) data points display the weld nugget sizes for the 1.6 mm·gap, 0° offset and 0 mm gap, 6° electrode offset tests with the universal electrodes, respectively. The universal electrodes of this invention produced larger weld nuggets than the commercial electrodes on the tests intended to duplicate non-ideal, real world welding conditions. In addition, the spread in size for welds made under ideal and non-ideal conditions is much smaller indicating a more consistent process. Thus, clearly the universal electrodes of this invention are suitable for heavy gauge aluminum sheets.

A second series of two groups of spot welding tests were conducted on AA503 aluminum alloy sheets to compare the performance of the subject universal electrodes with commercial electrodes specified for the aluminum sheet gauges to be welded. In these welding tests, one sheet was 1 mm thick and the overlapping sheet was 2.5 mm thick. A specified standard electrode was employed that had a machined face with an 8.5 mm face diameter and a 2 in. (50.8 mm) radius of curvature. This electrode was nearly identical to the commercially available MWZ-6256 electrode which is used industrially for welding light gauge aluminum sheet.

In each case, the applied force of the electrodes was 800 lbs. the welding current duration was for 10 cycles of the rectified current. With the thinner specimen thickness, the currents delivered were varied from about 20,000 amperes to about 30,000 amperes. The minimum suitable weld nugget diameter was 4.1 mm.

Again, in each electrode test group, the first set of tests (□ data points) used sheet specimens with no gap at the weld site and the electrodes had no offset angle. In each second set of tests (Δ data points), the specimens had a 0.8 mm gap at the spot weld site with no offset of the electrodes (i.e., 0° offset angle). And the third sets of tests (○ data points) were conducted in which there was no gap between the sheets but the electrodes were offset by 6 degrees from the preferred perpendicular alignment.

Figure 5A:
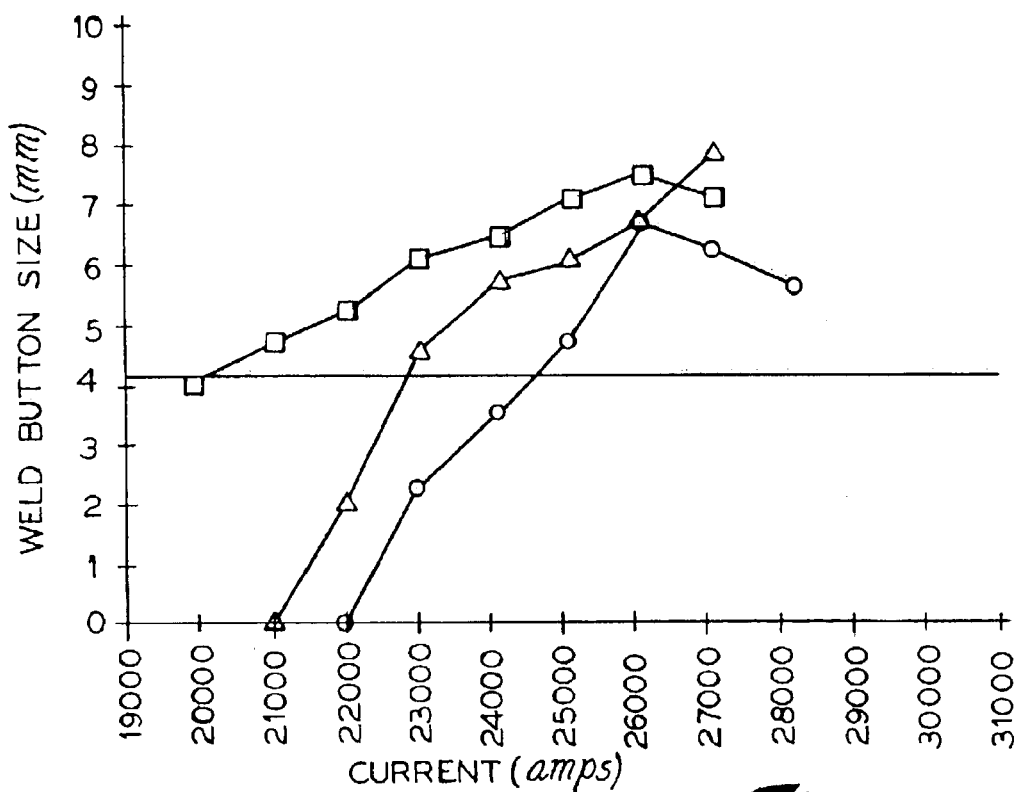
FIGS. 5A and 5B are graphs of weld button size in mm vs. welding current obtained in spot welding of varying gauge sheets, a 1 nun sheet and a 2.5 mm sheet, and each of AA5083 composition. The data in FIG. 5A was obtained with an as-machined electrode like the commercial electrode MWZ-6256. The data in FIG. 5B was obtained using electrodes of this invention.
Figure 5B:
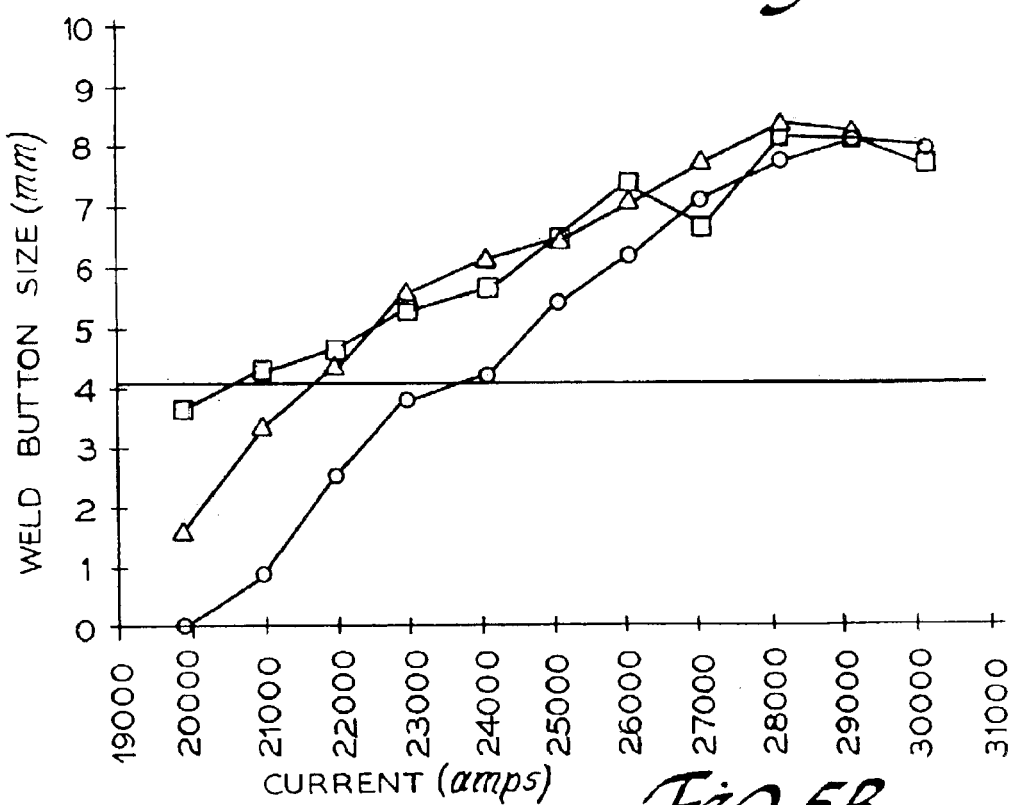

FIG. 5A presents the data of the as-machined commercial electrodes. It is seen that in welding these mismatched sheet sizes, many of the weld nugget sizes were sub-par or marginal whereas substantially many of the spot welds made with the universal electrodes were good even though they were not specifically adapted for the unequal sheet metal gauges. As before, the spread in the data for the universal electrode is significantly tighter indicating a more robust, consistent process.

This invention thus provides welding electrodes that are suitable for welding in succession, on a repetitive basis, sheet metal gauges of different sizes. Either where the sheet layers vary in thickness from workpiece to workpiece, or where they present widely different sheet metal gauges within the same workpiece, this invention offers a tremendous practical advantage in real production conditions over the prior art practice of using a different set of specified electrodes for different gauges of aluminum sheet. The use of the unique and universal electrodes provided by this invention enable a single welding station to successively perform spot welding jobs on workpieces of varying sheet thickness. Where flexible manufacturing operation is needed, these electrodes offer a tremendous advantage in sustained and high efficiency welding operations.

The practice of the invention has been illustrated with a few specific examples but the scope of the invention is limited only by the following claims.

What is claimed is:

1. A method of forming spot welds in a workpiece of aluminum alloy sheet metal, each said workpiece comprising two or more layers of said sheet metal with each layer having thickness of from about 0.9 mm to about 4 mm or more, said method comprising:

pressing two opposing copper or copper alloy electrodes on opposite sides of said layers of sheet metal to provide a contact force and electrical contact with said layers for said spot weld, said electrodes each having a round body with a diameter of at least 11 millimeters and terminating at one end in a round cone with a spherically crowned weld face surface, the diameter of said crowned weld face surface being in the range of 11 millimeters to the diameter of said body and the radius of said spherically crowned weld face surface being in the range of about 20 to 35 millimeters, and the surface of said crowned weld face surface having a texture; and passing a welding current between said electrodes to produce a spot weld nugget between said workpieces.

2. A method as recited in claim 1 in which said electrodes each have a round body with a diameter in the range of about 11 to 19.5 millimeters.

3. A method as recited in claim 1 in which the diameter of said weld face is in the range of about 11.5 mm to about 19 mm.

4. A method as recited in claim 1 in which the diameter of said weld face is in the range of about 11.8 mm to about 11.9 mm.

5. A method as recited in claim 1 in which the radius of said spherically crowned weld face is in the range of about 20 mm to about 35 mm.

6. A method as recited in claim 1 in which the radius of curvature of said spherically crowned weld face is in the range of about 25 mm to about 26 mm.

7. A method as recited in claim 1 in which the texture of said weld face surface is characterized by a peak to valley roughness of about 5 to 30 micrometers.

8. A method of forming spot welds as recited in claim 1 comprising forming said spot welds in a succession of said work pieces in which the thicknesses of said layers vary from workpiece to workpiece using the same electrodes.

9. A method of forming spot welds as recited in claim 2 comprising forming said spot welds in a succession of said work pieces in which the thicknesses of said layers vary from workpiece to workpiece using the same electrodes.

10. A method of forming spot welds as recited in claim 3 comprising forming said spot welds in a succession of said work pieces in which the thicknesses of said layers vary from workpiece to workpiece using the same electrodes.

11. A method of forming spot welds as recited in claim 6 comprising forming said spot welds in a succession of said work pieces in which the thicknesses of said layers vary from workpiece to workpiece using the same electrodes.

12. A method of forming spot welds as recited in claim 7 comprising forming said spot welds in a succession of said work pieces in which the thicknesses of said layers vary from workpiece to workpiece using the same electrodes.

13. A method of making successive spot welds on a group of workpieces where each workpiece comprises two or more layers of aluminum alloy sheet metal and each layer has a thickness in the range from about 0.9 millimeters to about 4 millimeters, said group of workpieces comprising at least one member having sheet metal layers that differ in thicknesses within said range from other members of said group, said method comprising:

(a) placing a first workpiece between a pair of axially opposing copper or copper alloy electrodes;

(b) pressing said electrodes against opposite sides of said workpiece at a spot welding location to apply a contact force and electrical contact with contacted layers for said spot weld;

(c) passing an electrical current through said electrodes and said workpiece at said location for a time sufficient to make said spot weld;

(d) opening said electrodes for relocation or removal of said workpiece; and (e) repeating steps (a) through (d) with successive workpieces of said group, said electrodes each having a body terminating at one end in a truncated round cone with a spherically crowned weld face surface, the diameter of said crowned weld face surface being in the range of about 11.5 mm to about 12.5 millimeters and the radius of said spherically crowned weld face surface being in the range of about 20 to about 35 millimeters, and the surface of said crowned weld face surface having a texture.

14. A method as recited in claim 13 in which the diameter of said weld face is in the range of about 11.8 mm to about 11.9 mm.

15. A method as recited in claim 13 in which the radius of said spherically crowned weld face is in the range of about 20 mm to about 35 mm.

16. A method as recited in claim 13 in which the radius of said spherically crowned weld face is in the range of about 25 mm to about 26 mm.

17. A method as recited in claim 13 in which said weld face surface is characterized by a peak to valley roughness of 5 to 30 micrometers.

* * * * *